United States Patent
Eaton

(10) Patent No.: US 12,040,994 B2
(45) Date of Patent: Jul. 16, 2024

(54) METHODS AND SYSTEMS FOR REGULATING NETWORK CONNECTIVITY FROM A GATEWAY

(71) Applicant: DISH Network L.L.C., Englewood, CO (US)

(72) Inventor: Zane C. Eaton, Pompano Beach, FL (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 18/181,025

(22) Filed: Mar. 9, 2023

(65) Prior Publication Data

US 2023/0308399 A1    Sep. 28, 2023

Related U.S. Application Data

(60) Provisional application No. 63/323,027, filed on Mar. 23, 2022.

(51) Int. Cl.
*H04L 47/70* (2022.01)

(52) U.S. Cl.
CPC .......... *H04L 47/822* (2013.01); *H04L 47/821* (2013.01)

(58) Field of Classification Search
CPC ............................. H04L 47/822; H04L 47/821
See application file for complete search history.

(56) References Cited

U.S. PATENT DOCUMENTS

| | | | | |
|---|---|---|---|---|
| 2008/0049753 A1* | 2/2008 | Heinze | ................. | H04L 47/822 370/392 |
| 2012/0216259 A1* | 8/2012 | Okamoto | ............ | H04L 12/4641 709/225 |
| 2018/0302907 A1* | 10/2018 | Niina | .................... | H04W 72/56 |
| 2019/0110223 A1* | 4/2019 | Nekoui | ................ | H04W 28/18 |
| 2021/0092035 A1* | 3/2021 | Williams | ............... | H04L 47/22 |

* cited by examiner

*Primary Examiner* — Kristie D Shingles
(74) *Attorney, Agent, or Firm* — Perkins Coie LLP

(57) ABSTRACT

The present disclosure is directed to methods and systems for distributing network connectivity from a gateway. The network access system can include a gateway with the ability to support regulating network access to various devices. The network access functionality can be configurable and customizable to various users or devices. The gateway can connect to a source and determine the bandwidth. Using the determined bandwidth, the gateway can allocate the bandwidth among the devices according to a priority order of the devices. In some implementations, the gateway can receive customizable features from the user for bandwidth allocation to devices connected the gateway. The gateway can track the network usage by MAC address of a device and disconnect the device from the network when the network usage reaches a threshold.

20 Claims, 6 Drawing Sheets

METHODS AND SYSTEMS FOR REGULATING NETWORK CONNECTIVITY FROM A GATEWAY

CROSS-REFERENCE TO RELATED APPLICATIONS

This application claims the benefit of U.S. Provisional Patent Application No. 63/323,027, filed Mar. 23, 2022, which is incorporated by reference in its entirety.

BACKGROUND

A user can pay for an internet network provided by an internet service provider (ISP). However, often the user does not utilize the full capability of the internet that they receive. In some cases, a user can share access to the internet network by giving other users the access credentials to the network.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Aspects of the present disclosure are directed to methods and systems for regulating network connectivity from a gateway. The network access system can include a gateway (e.g., a router, such as a 5G router) with the ability to support regulating network access to various devices. The network access functionality can be configurable and customizable to various users or devices. The gateway can connect to a source (e.g., internet service provider (ISP), cable networks, OTA networks, satellite networks, etc.) and determine the bandwidth. Using the determined bandwidth, the gateway can allocate the bandwidth among the devices according to a priority order of the devices. For example, a first device has a higher bandwidth priority than a second device.

In some implementations, the gateway can receive customizable features from the user for bandwidth allocation to devices connected the gateway. Examples of the customizable features can include security options, parental controls, operational hours, MAC address specific operations, MAC address usage, number of user limits, and internet usage tracking. For example, a parent can define the time and duration a device of their child can connect to the network. The gateway can track the network usage (e.g., bandwidth usage or network usage duration) by MAC address of a device. When the network usage reaches a threshold, the gateway can send a notification to the device and/or disconnect the device from the network. In some implementations, the gateway determines the bandwidth allocation priority of the device based on the customizable features.

Methods and systems disclosed herein can provide technical advantages over conventional gateway systems. For example, the disclosed network access gateway system provides: 1) the ability to support regulating network access to multiple devices; 2) the ability to allocate bandwidth among the multiple devices; 3) the ability to track network usage of a device; and 4) the ability to dynamically adjust the bandwidth based on a priority order of the devices and/or customizable features.

Figure 1:
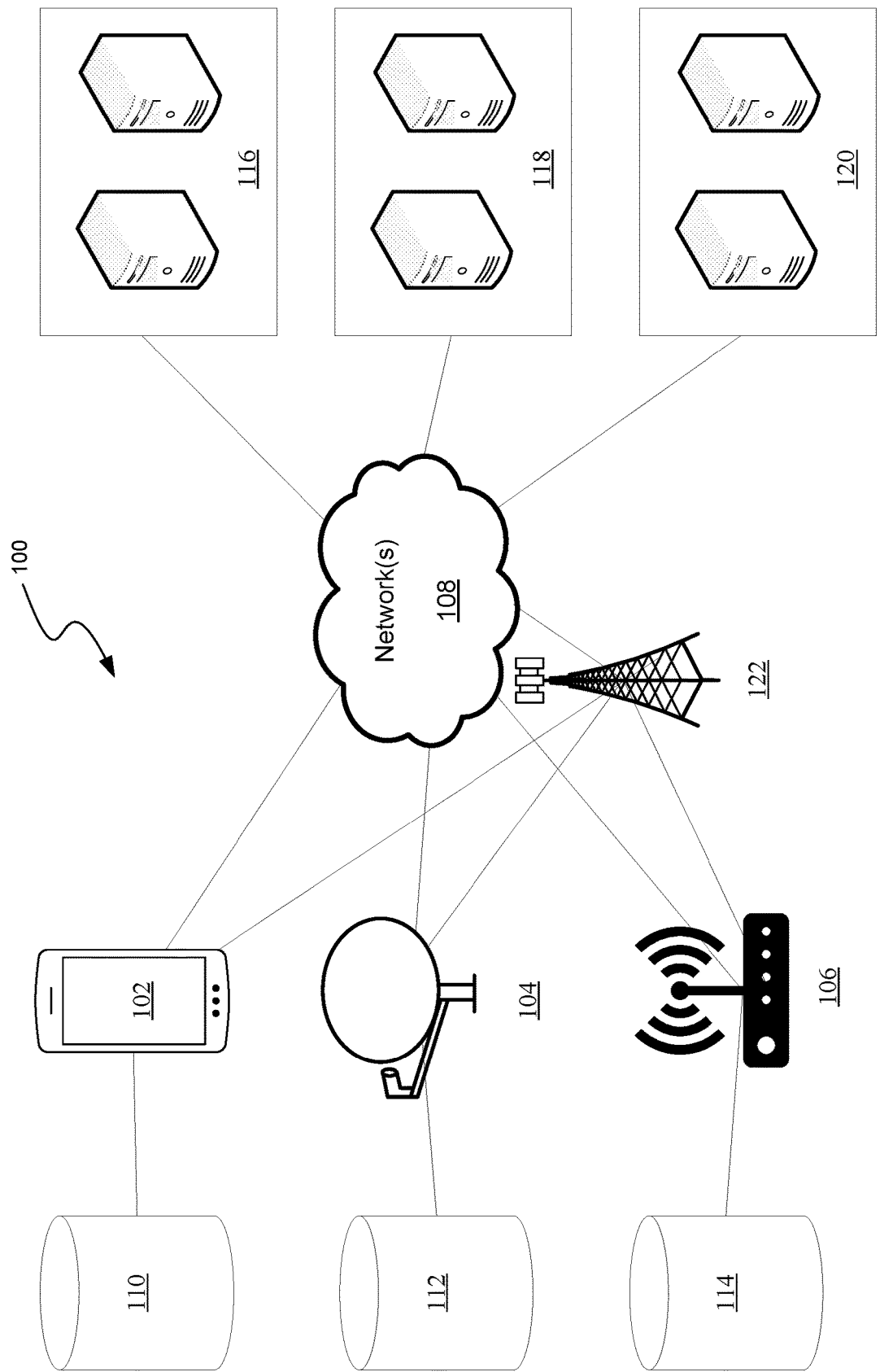
FIG. 1 illustrates an example of a distributed system for regulating network connectivity from a gateway.

FIG. 1 illustrates an example of a distributed system for regulating network connectivity from a gateway. Example system 100 presented is a combination of interdependent components that interact to form an integrated whole for regulating network connectivity from a gateway. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to regulate network access from a gateway. In one example, a client device 102 may be a mobile phone, a client device 104 may be a smart OTA antenna, and a client device 106 may be a broadcast module box (e.g., set-top box). In other example aspects, client device 106 may be a gateway device (e.g., router) that is in communication with sources, such as ISPs, cable networks, or satellite networks. Other possible client devices include but are not limited to tablets, personal computers, televisions, etc. In aspects, a client device, such as client devices 102, 104, and 106, may have access to one or more networks from a gateway. In other aspects, client devices 102, 104, and 106, may be equipped to receive data from a gateway. The signals that client devices 102, 104, and 106 may receive may be transmitted from satellite broadcast tower 122. Broadcast tower 122 may also be configured to communicate with network(s) 108, in addition to being able to communicate directly with client devices 102, 104, and 106. In some examples, a client device may be a set-top box that is connected to a display device, such as a television (or a television that may have set-top box circuitry built into the television mainframe).

Client devices 102, 104, and 106 may be configured to run software that determines a prioritized order of the devices on the network, receives customizable features for the devices, and allocates bandwidth among the devices according to the prioritized order of the devices or the customizable features for each device. Client devices 102, 104, and 106 may access content data through the network. The content data may be stored locally on the client device or run remotely via network(s) 108. For example, a client device may receive a signal from broadcast tower 122 containing content data. The signal may indicate user requested media content. The client device may receive this user requested content data and subsequently store this data locally in databases 110, 112, and/or 114. In alternative scenarios, the user requested content data may be transmitted from a client device (e.g., client device 102, 104, and/or 106) via network(s) 108 to be stored remotely on server(s) 116, 118, and/or 120. A user may subsequently access the media content data from a local database (110, 112, and/or 114)

and/or external database (116, 118, and/or 120), depending on where the media content data may be stored. The system may be configured to receive and process user requested content data in the background.

In some example aspects, client devices 102, 104, and/or 106 may be equipped to receive signals from an input device. Signals may be received on client devices 102, 104, and/or 106 via Bluetooth, Wi-Fi, infrared, light signals, binary, among other mediums and protocols for transmitting/receiving signals. For example, a user may use a mobile device 102 to check for the content data from a channel from an OTA antenna (e.g., antenna 104). A graphical user interface may display on the mobile device 102 the requested content data. Specifically, at a particular geolocation, the antenna 104 may receive signals from broadcast tower 122. The antenna 104 may then transmit those signals for analysis via network(s) 108. The results of the analysis may then be displayed on mobile device 102 via network(s) 108. In other examples, the results of the analysis may be displayed on a television device connected to a broadcast module box, such as broadcast module box 106.

In other examples, databases stored on remote servers 116, 118, and 120 may be utilized to assist the system in providing content to a user from a gateway regulating network access. Such databases may contain certain content data such as video titles, actors in movies, video genres, etc. Such data may be transmitted via network(s) 108 to client devices 102, 104, and/or 106 to assist in identifying user requested media content. Because broadcast tower 122 and network(s) 108 are configured to communicate with one another, the systems and methods described herein may be able to identify requested media content in different sources, such as streaming services, local and cloud storage, cable, satellite, or OTA.

Figure 2:
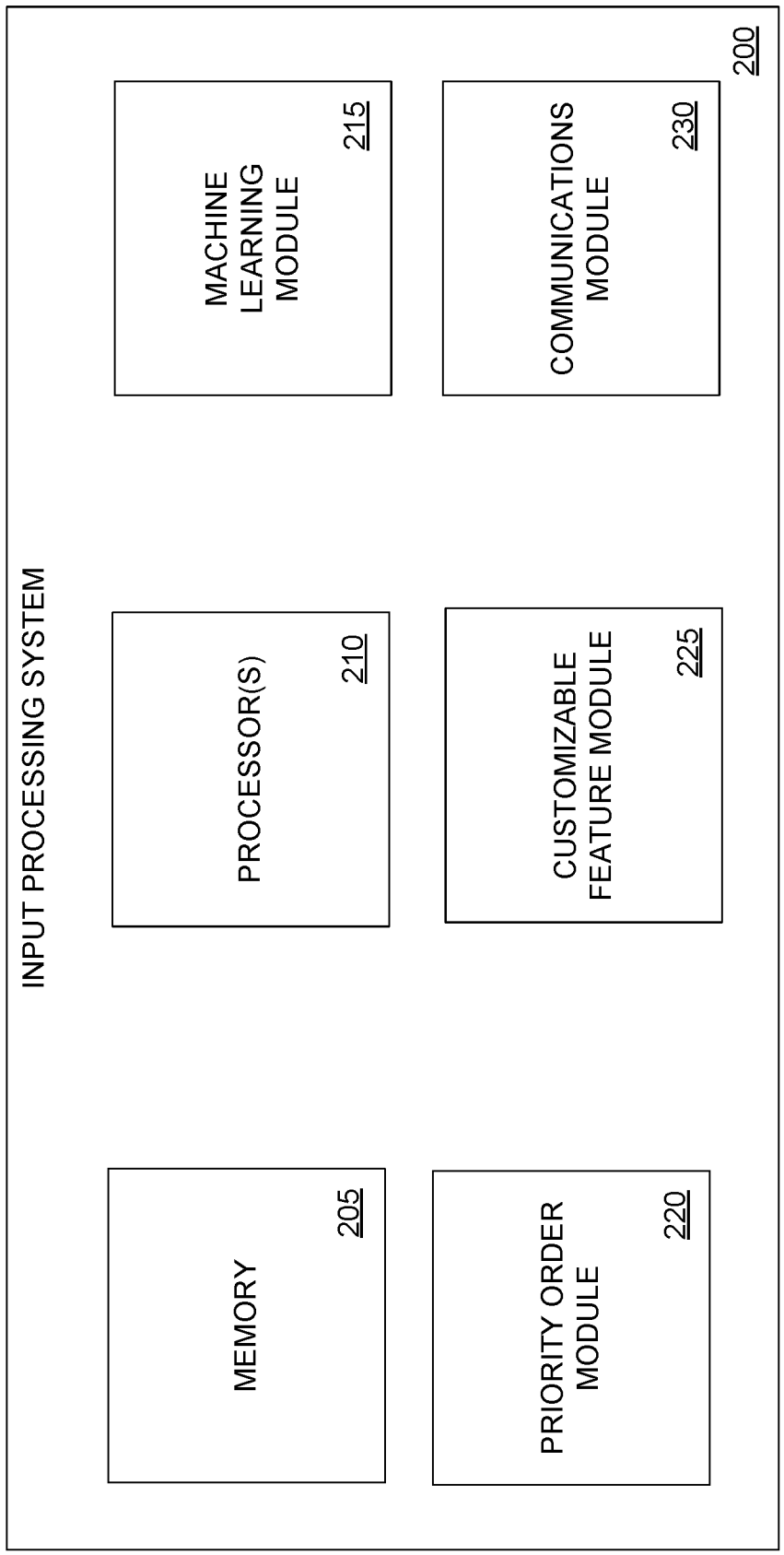
FIG. 2 illustrates an example input processing system for implementing systems and methods for regulating network connectivity from a gateway.

FIG. 2 illustrates an example input processing system for implementing systems and methods for regulating network connectivity from a gateway. The input processing system (e.g., one or more data processors) is capable of executing algorithms, software routines, and/or instructions based on processing data provided by a variety of sources related to determining a prioritized order of networks and allocating bandwidth to the networks according to the prioritized order. The input processing system can be a general-purpose computer or a dedicated, special-purpose computer. According to the embodiments shown in FIG. 2, the disclosed system can include memory 205, one or more processors 210, machine learning module 215, priority order module 220, customizable feature module 225, and communications module 230. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of machine learning module 215, priority order module 220, customizable feature module 225, and communications module 230. Generally, memory 205 can include any device, mechanism, or populated data structure used for storing information. In accordance with some embodiments of the present disclosures, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205. In some example aspects, memory 205 may store at least one database containing the customizable features of the devices, a prioritized order of the devices, or user requested content information, such as audio or video data.

Machine learning module 215 may be configured to analyze gateway settings to determine a bandwidth allocation setting (e.g., prioritized order of bandwidth allocation) of the devices for bandwidth allocation. The machine learning module 215 may be configured to determine a bandwidth allocation setting based on at least one machine-learning algorithm trained on at least one dataset reflecting a user selected bandwidth allocation setting of devices. The at least one machine-learning algorithms (and models) may be stored locally at databases and/or externally at databases (e.g., cloud databases and/or cloud servers). Client devices may be equipped to access these machine learning algorithms and intelligently identify user preferences, such as the customizable features, and determine a bandwidth allocation setting such as a prioritized order of the devices for bandwidth allocation based on at least one machine-learning model that is trained on a user's historical device bandwidth allocation setting history. For example, if a user frequently prioritizes device A over device B, the user's priority history may be collected to train a machine-learning model to automatically prioritize device A over device B, or over a new device connecting to the gateway.

As described herein, a machine-learning (ML) model may refer to a predictive or statistical utility or program that may be used to determine a probability distribution over one or more character sequences, classes, objects, result sets or events, and/or to predict a response value from one or more predictors. A model may be based on, or incorporate, one or more rule sets, machine learning, a neural network, or the like. In examples, the ML models may be located on the client device, service device, a network appliance (e.g., a firewall, a router, etc.), or some combination thereof. The ML models may process user priority history and other data stores of user preferences (e.g., surveys, user profile settings, etc.) to determine the priority order of the device connected to a gateway. Determining a priority order for a certain device may comprise identifying various characteristics of a user's priority history and preferences. For instance, if a user has a user profile that displays preferences of user priority (e.g., parent has higher priority than a child, an internet subscriber has a higher priority than a neighbor connecting to the gateway, or a device used for work has a higher priority than a device used for entertainment), then the system described herein may determine that certain devices be prioritized based on the content or user of the network. Based on an aggregation of data from a user's priority history, user profiles, gateway settings, network settings, MAC address, and other user data stores, at least one ML model may be trained and subsequently deployed to automatically determine a priority order of the devices for bandwidth allocation. The trained ML model may be deployed to one or more devices. As a specific example, an instance of a trained ML model may be deployed to a server device and to a client device. The ML model deployed to a server device may be configured to be used by the client device when, for example, the client device is connected to the internet. Conversely, the ML model deployed to a client device may be configured to be used by the client device when, for example, the client device is not connected to the internet. In some instances, a client device may not be connected to the internet but still configured to receive satellite signals with multimedia information and channel guides. In such examples, the ML model may be locally cached by the client device.

Priority order module 220 is configured identify devices connected to a gateway and determine a priority order of the devices for bandwidth allocation. The priority order module 220 can determine a priority order for the devices based on user preferences, user settings, or the MAC address of each device. In some implementations, the priority order is predetermined by a user, and the priority order module 220 assigns priority values to the devices based on the predetermined priority order. The system described herein can allocate bandwidth to the devices according to the priority order.

Customizable feature module 225 is configured to receive and analyze customizable features for each device connected to the gateway. Examples of the customizable features can include usage tracking per MAC address, security options, parental controls, operational hours, MAC address specific operations, number of user limits, and internet usage tracking. The customizable feature module 225 can rank the devices based on the customizable feature settings. For example, a device with fewer settings receives a lower ranking than a device with more settings. Priority order module 220 can use the customizable feature settings from customizable feature module 225 to determine a priority order of the devices.

Communications module 230 is associated with sending/receiving information (e.g., priority order information from machine learning module 215, priority order module 220, and customizable feature module 225) with a remote server or with one or more client devices, streaming devices, routers, OTA boxes, set-top boxes, etc. These communications can employ any suitable type of technology, such as Bluetooth, WiFi, WiMax, cellular, single hop communication, multi-hop communication, Dedicated Short Range Communications (DSRC), or a proprietary communication protocol. In some embodiments, communications module 230 sends priority order information identified by the priority order module 220 and information identified by the customizable feature module 225. Furthermore, communications module 230 may be configured to communicate content data to a client device and/or OTA box, smart OTA antenna, and/or smart TV, etc.

Figure 3:
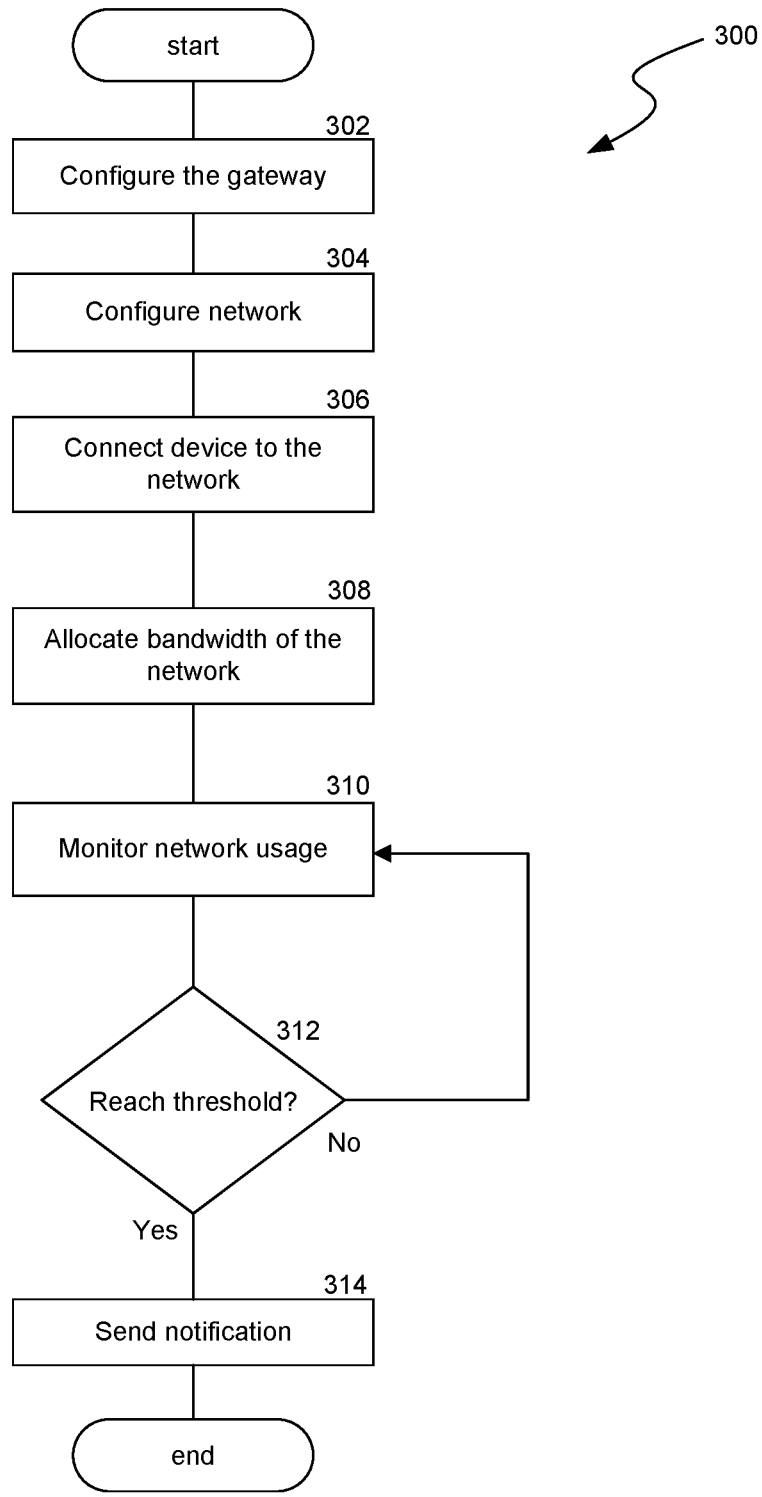
FIG. 3 is a flow diagram illustrating a process used in some implementations for regulating network connectivity from a gateway.

FIG. 3 is a flow diagram illustrating a process 300 used in some implementations for regulating network connectivity from a gateway. In some implementations, process 300 is triggered by a user activating a subscription for network connectivity, powering on a device, a device connecting to a gateway (e.g., router), powering on the gateway, the gateway connecting to a source (e.g., ISP, cable network, satellite network, etc.), or the user downloading an application on a device for network connectivity. In various implementations, process 300 is performed locally on the user device or performed by cloud-based device(s) that can regulate network connectivity from a gateway.

At block 302, process 300 connects a gateway to a source and configures the settings of the gateway. A user can select gateway settings on the gateway device, such as on a user interface screen or buttons on the gateway device, or the user can input settings in an application on a user device, such as a smart phone or tablet. When registering or activating the gateway, the user can provide access information (e.g., passwords, usernames, biometrics, etc.), user preferences, security settings, parental controls, MAC address usage limits, operational hours, bandwidth usage settings, connectivity duration settings, MAC address specific operations, user limits, number of user limits, and network usage settings for devices. For example, a user can define the time of day a device can access the network, define the user credentials required to access a network, define the devices that can connect to the network, define the duration of network access for a device, define an allotment of bandwidth for the device, a priority order of bandwidth allocation for a device, define the hours of operation on a network for a device, set a limit on the amount of data that can be streamed or downloaded on the network by a device, and define the type of content than can be viewed by a device. In some implementations, a gateway setting includes requiring a fee (e.g., pay for access to the network) for a device to access the network. Based on the fee, the device can be allotted a duration of network access or allocated bandwidth of the network. In some cases, a user can adjust the network usage of a device. For example, a parent can load a child's allowance (e.g., based on good grades in school, duration of practicing a musical instrument, learning a language, etc.) into the gateway as a duration of network access or bandwidth usage.

At block 304, process 300 configures the network provided by the gateway based on the gateway settings. Process 300 can generate a priority order of the devices for allocating bandwidth based on the gateway settings. In some embodiments, the priority order of the devices is based on the users accessing the network. For example, a first user (e.g., parent, landlord, etc.) has a higher priority than a second user (e.g., a child, tenant, etc.). Process 300 can identify the users based on user credentials (e.g., usernames, passwords, pins, biometrics, etc.) or user devices. In some embodiments, the priority order of the devices is based on the frequency that the network is accessed by users. For example, if a first device accesses the network more frequently than a second device, the first device has a higher priority than the second device.

In some embodiments, the priority order of the devices is based on the time of day. For example, a first device has a higher priority than a second device in the evening from 6 PM until 9 PM, such as the device of a student has a higher priority each evening for homework than the device of a gamer connected to the network. In some embodiments, the priority order of the devices is based on the devices (e.g., MAC addresses of the device) accessing the networks. For example, a first device (e.g., laptop or tablet) has a higher priority than a second device (e.g., smartphone, smart TV, etc.). In some embodiments, the priority order of the devices is based on requests from the user(s). For example, a user can request to have their device receive top priority for bandwidth allocation.

At block 306, process 300 connects the user devices to the network provided by the gateway. The user devices can access the network according to the gateway settings of block 302, such as security settings, parental controls, operational hours, MAC address specific operations, number of user limits, and network usage settings. In some implementations, a user of a device can view the remaining network usage (e.g., network duration or bandwidth) they are allotted on a user interface.

At block 308, process 300 allocates the bandwidth to the devices according to the priority order. Process 300 can have a priority queue of the devices. When data is received or transmitted from the gateway, the bandwidth is allocated by the gateway for the transmitting or receiving action according to the priority order of the devices. At block 310, process 300 monitors the network usage of a device connected to the network. Process 300 can track the bandwidth usage of a device or the duration that a device is connected to the network.

At block 312, process 300 determines whether a device has reached the network usage threshold allotted by the gateway settings. If the device has not reached the network usage threshold, process 300 can continue to monitor the bandwidth usage and duration of connectivity of the device. When the device has reached the network usage threshold, at block 314 process 300 sends a notification to the device. In some implementations, process 300 monitors the network and determines when to enforce the gateway settings for the connected devices. In a first example, when a device reaches its bandwidth usage allotment, process 300 sends an alert to the user device or disconnects the user device from the network. In a second example, when a user reaches the end of their operational hours on the network, process 300 sends an alert to the user device or disconnects the user device from the network. In a third example, when the device reaches the network usage threshold, process 300 sends the device a notification with a renewal fee for additional access. In some embodiments, process 300 ensures that devices of higher priority in the priority queue, receive priority over other devices and can deactivate/disconnect lower priority devices when the bandwidth falls below a threshold.

Figure 4:
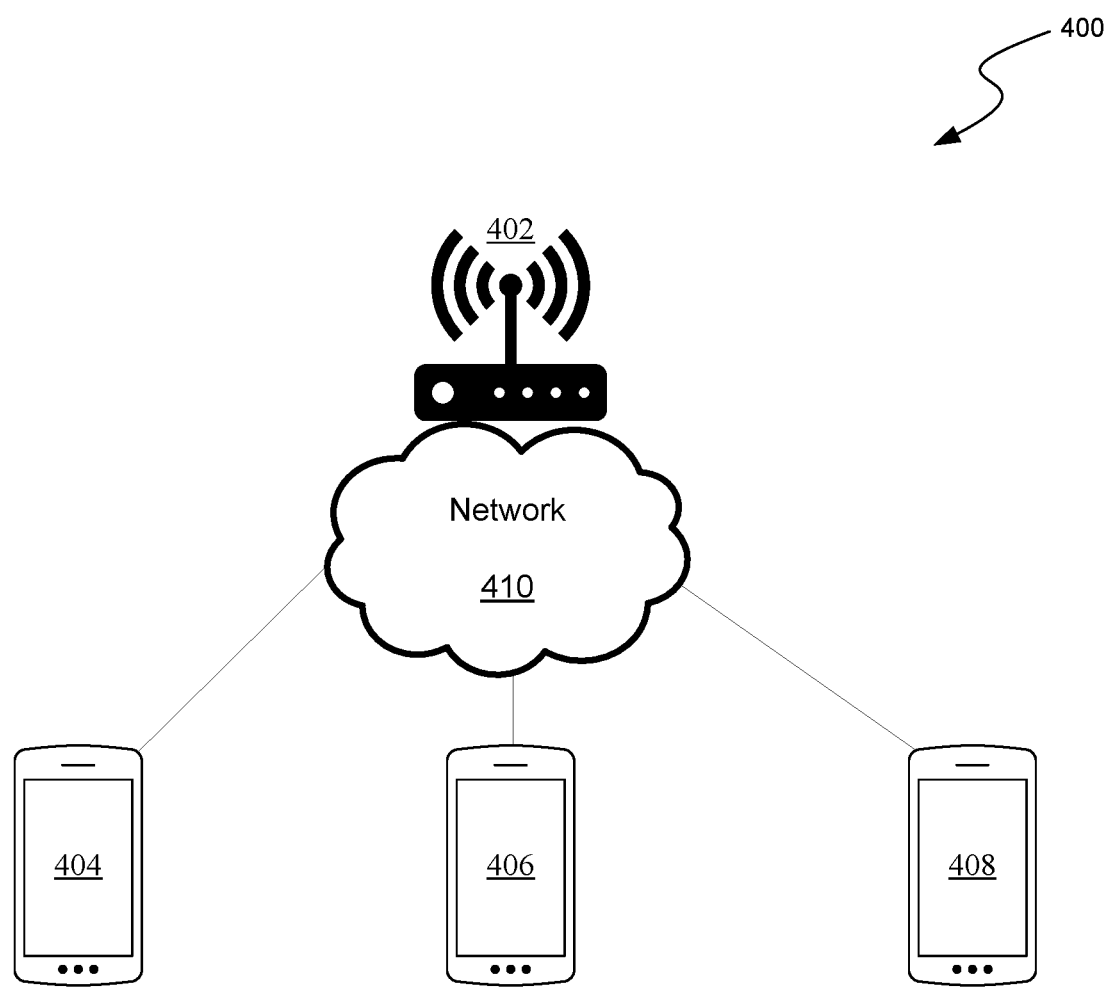
FIG. 4 illustrates an example of a gateway regulating network connectivity to multiple devices, as described herein.

FIG. 4 illustrates an example of a gateway regulating network connectivity to multiple devices, as described herein. In environment 400, gateway 402 (e.g., router) provides network 410 to devices 404, 406, and 408. Gateway 402 can regulate the duration of access, type of access, or bandwidth allocation to the devices 404, 406, and 408 connected to network 410.

Figure 5:
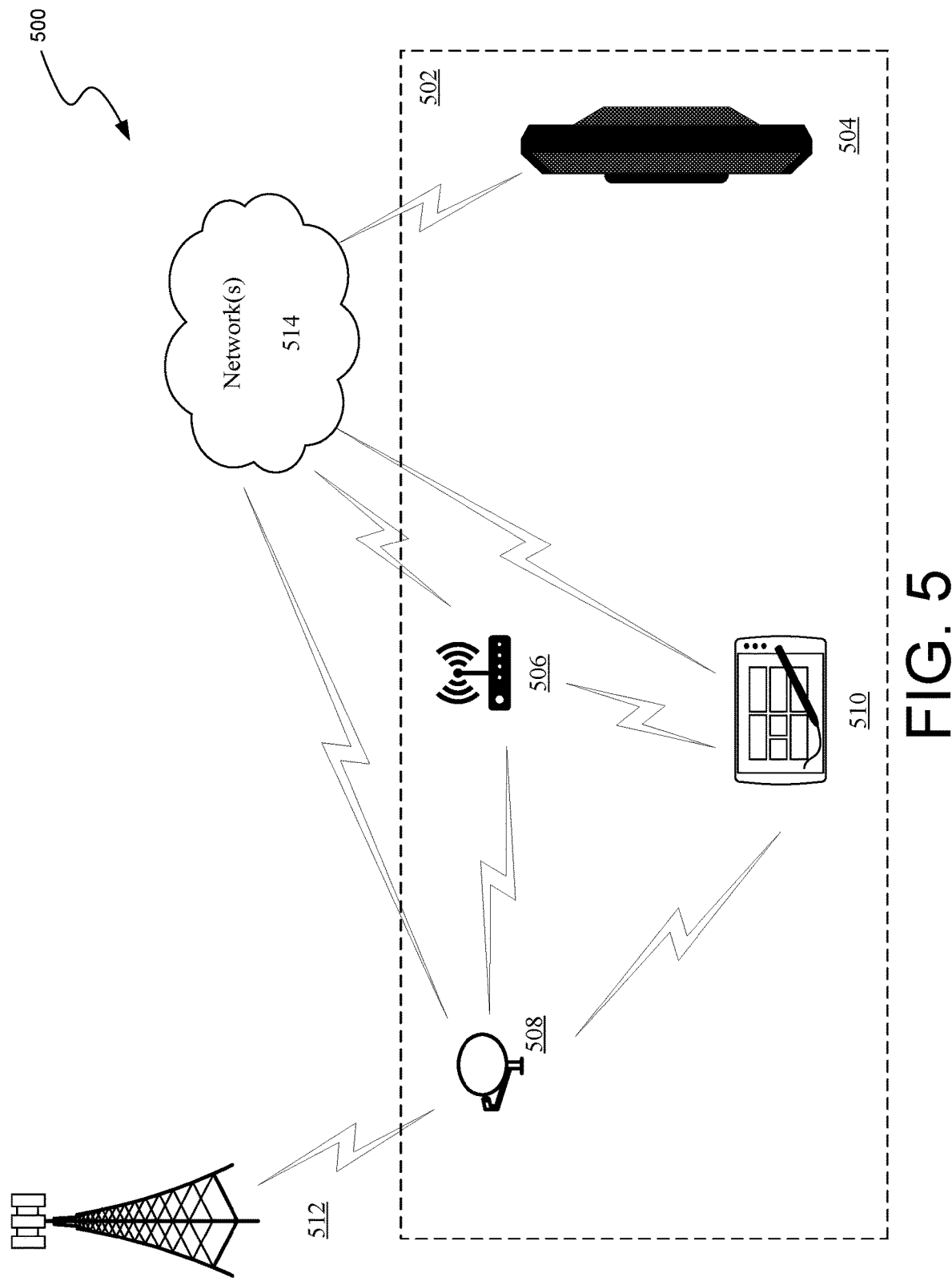
FIG. 5 illustrates an example environment of operation of the disclosed technology.

FIG. 5 illustrates an example environment of operation of the disclosed technology. In the example environment illustrated in FIG. 5, area 502 may represent a house, a commercial building, an apartment, a condo, or any other type of suitable dwelling. Inside area 502 is at least one television 504, an OTA box 506 (e.g., router or broadcast module box) an OTA antenna 508, and a mobile device 510. Each of these devices may be configured to communicate with network(s) 514. OTA box 506 may be configured as a central gateway communicable with various multimedia content providers, networks, devices, and user storage sources, among other servers and databases housing content available for retrieval and display on user devices. Network(s) 514 may be a WiFi network and/or a cellular network. The OTA antenna 508 may also be configured to receive local broadcast signals from local broadcast tower 512 or satellite broadcast tower.

Figure 6:
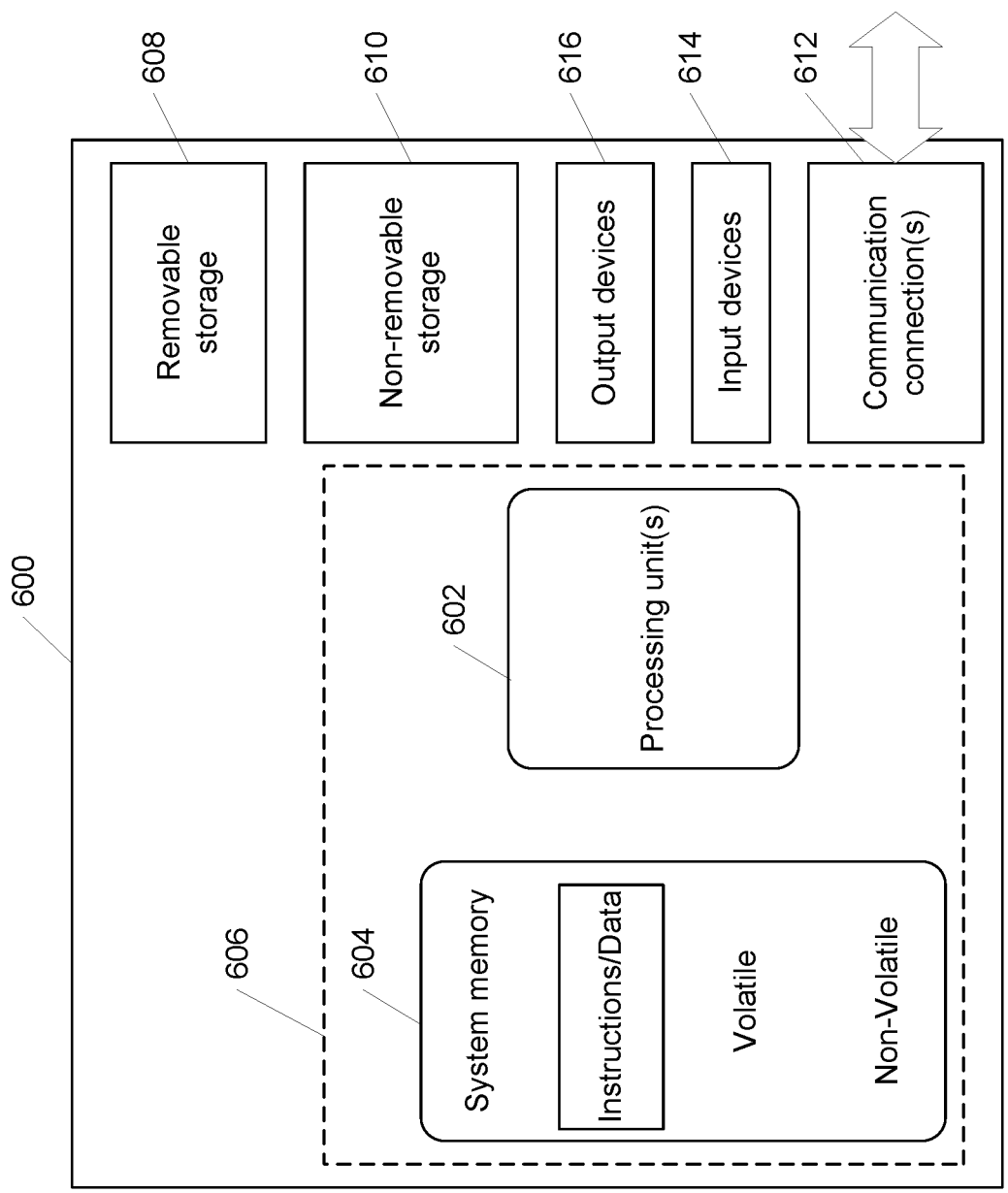
FIG. 6 illustrates one example of a suitable operating environment in which one or more of the present embodiments may be implemented.

FIG. 6 illustrates one example of a suitable operating environment in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 600 typically includes at least one processing unit 602 and memory 604. Depending on the exact configuration and type of computing device, memory 604 (storing, among other things, information related to detected devices, compression artifacts, association information, personal gateway settings, and instruction to perform the methods disclosed herein) may be volatile (such as RAM), non-volatile (such as ROM, flash memory, etc.), or some combination of the two. This most basic configuration is illustrated in FIG. 6 by dashed line 606. Further, environment 600 may also include storage devices (removable 608 and/or non-removable 610) including, but not limited to, magnetic or optical disks or tape. Similarly, environment 600 may also have input device(s) 614 such as keyboard, mouse, pen, voice input, etc., and/or output device(s) 616 such as a display, speakers, printer, etc. Also included in the environment may be one or more communication connections, 612, such as Bluetooth, WiFi, WiMax, LAN, WAN, point to point, etc.

Operating environment 600 typically includes at least some form of computer readable media. Computer readable media can be any available media that can be accessed by processing unit 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM EEPROM, flash memory or other memory technology, CD-ROM, digital versatile disks (DVD) or other optical storage, magnetic cassettes, magnetic tape, magnetic disk storage, or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulate data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The operating environment 600 may be a single computer (e.g., mobile computer) operating in a networked environment using logical connections to one or more remote computers. The remote computer may be a personal computer, a server, a router, a network PC, a peer device, an OTA antenna, a set-top box, or other common network node, and typically includes many or all of the elements described above as well as others not so mentioned. The logical connections may include any method supported by available communications media. Such networking environments are commonplace in offices, enterprise-wide computer networks, intranets, and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and the alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A method comprising:
   configuring a network provided by a gateway for connectivity to a first device and a second device;
   determining the first a greater number of customizable network connection settings than the second device;
   generating a priority order of allocating bandwidth among the first device and the second device based on the first device having the greater number of customizable network connection settings than the second device;
   allocating bandwidth of the network to the first device and the second device according to the priority order; and
   monitoring network usage of the first device and the second connected to the network, wherein the network usage includes a bandwidth usage and a connection duration of the first device and the second device.

2. The method of claim 1, further comprising:
   determining the first device has reached a threshold of the network usage; and
   disconnecting the first device from the network.

3. The method of claim 1, further comprising:
   receiving at least one customizable network connection setting for the first device.

4. The method of claim 1, further comprising:
   detecting as third device connect to the network provided by the gateway;
   generating a second priority order of allocating the bandwidth among the first device, the second device, and the third device connected to the network; and
   allocating the bandwidth to the first device, the second device, and the third device according to the priority order.

5. The method of claim 1, further comprising:
   tracking the network usage of the first device;
   determining the first device has reached a threshold of the network usage; and
   in response to the network usage reaching the threshold, transmitting, to the first device, a notification.

6. The method of claim 1, wherein the customizable network connection settings include an operational time setting, a media access control address tracking setting, or a network usage tracking setting.

7. The method of claim 1, wherein the priority order of allocating the bandwidth is determined by at least one machine-learning algorithm, wherein the at least one machine-learning algorithm is trained based on at least one dataset associated with a past priority order of allocating bandwidth.

8. A computing system comprising:
   one or more processors; and
   one or more memories storing instructions that, when executed by the one or more processors, cause the computing system to perform the steps of:
      configuring a network provided by a gateway for connectivity to a first device and a second device;
      determining the first device has a greater number of customizable network connection settings than the second device;
      generating a priority order of allocating bandwidth among the first device and the second device based on the first device having the greater number of customizable network connection settings than the second device;
      allocating bandwidth of the network to the first device and the second device according to the priority order; and
      monitoring network usage of the first device and the second device connected to the network, wherein the network usage includes a bandwidth usage and a connection duration of the first device and the second device.

9. The computing system of claim 8, wherein the steps further comprise:
   determining the first device has reached a threshold of the network usage; and
   disconnecting the first one device from the network.

10. The computing system of claim 8, wherein the steps further comprise:
    receiving at least one customizable network connection setting for the first device.

11. The computing system of claim 8, wherein the steps further comprise:
    detecting a third device connect to the network provided by the gateway;
    generating a second priority order of allocating the bandwidth among the first device, the second device, and the third device connected to the network; and
    allocating the bandwidth to the first device, the second device, and the third device according to the priority order.

12. The computing system of claim 8, wherein the steps further comprise:
    tracking the network usage of the first device;
    determining the first device has reached a threshold of the network usage; and
    in response to the network usage reaching the threshold, transmitting, to the first device, a notification.

13. The computing system of claim 8, wherein the customizable network connection settings includes an operational time setting, a media access control address tracking setting, or a network usage tracking setting.

14. The computing system of claim 8, wherein the priority order of allocating the bandwidth is determined by at least one machine-learning algorithm, wherein the at least one machine-learning algorithm is trained based on at least one dataset associated with a past priority order of allocating bandwidth.

15. A machine-readable storage medium having machine executable instructions stored thereon that, when executed by one or more processors, direct the one or more processors to perform a method comprising:
    configuring a network provided by a gateway for connectivity to a first device and a second device;
    determining the first device has a greater number of customizable network connection settings than the second device;
    generating a priority order of allocating bandwidth among the first device and the second device based on the first device having the greater number of customizable network connection settings than the second device;
    allocating bandwidth of the network to the first device and the second device according to the priority order; and
    monitoring network usage of the first device and the second device connected to the network, wherein the network usage includes a bandwidth usage and a connection duration of the first device and the second device.

16. The machine-readable storage medium of claim 15, wherein the method further comprises:
    determining the first device has reached a threshold of the network usage; and
    disconnecting the first device from the network.

17. The machine-readable storage medium of claim 15, wherein the method further comprises:
    receiving at least one customizable network connection setting for the first device.

18. The machine-readable storage medium of claim 15, wherein the method further comprises:
    detecting a third device connect to the network provided by the gateway;
    generating a second priority order of allocating the bandwidth among the first device, the second device, and the third device connected to the network; and
    allocating the bandwidth to the first device, the second device, and the third device according to the priority order.

19. The machine-readable storage medium of claim 15, wherein the method further comprises:
    tracking the network usage of the first device;
    determining the first device has reached a threshold of the network usage; and
    in response to the network usage reaching the threshold, transmitting, to the first device, a notification.

20. The machine-readable storage medium of claim 15, wherein the customizable network connection settings include an operational time setting, a media access control address tracking setting, or a network usage tracking setting, and
    wherein the priority order of allocating the bandwidth is determined by at least one machine-learning algorithm, wherein the at least one machine-learning algorithm is trained based on at least one dataset associated with a past priority order of allocating bandwidth.

* * * * *

UNITED STATES PATENT AND TRADEMARK OFFICE
CERTIFICATE OF CORRECTION

PATENT NO. : 12,040,994 B2
APPLICATION NO. : 18/181025
DATED : July 16, 2024
INVENTOR(S) : Zane C. Eaton It is certified that error appears in the above-identified patent and that said Letters Patent is hereby corrected as shown below:

In the Claims

Column 9 Claim 1, Line 40, after "first" insert --device has--

Column 9 Claim 1, Line 49, after "second" insert --device--

Column 9 Claim 4, Line 60, after "detecting" delete "as" and insert --a--

Column 9 Claim 4, Line 60, after "device" delete "connect" and insert --connected--

Column 10 Claim 9, Line 44, after "first" delete "one"

Column 10 Claim 11, Line 51, after "device" delete "connect" and insert --connected--

Column 10 Claim 13, Line 67, after "settings" delete "includes" and insert --include--

Column 12 Claim 18, Line 7, after "device" delete "connect" and insert --connected--

Signed and Sealed this
Twenty-fourth Day of September, 2024

Katherine Kelly Vidal
*Director of the United States Patent and Trademark Office*